United States Patent Office 3,247,010
Patented Apr. 19, 1966

3,247,010
POLYESTER COATING SYSTEM
Arthur P. Dowling, Lakewood, Ohio, assignor, by mesne assignments, to Diamond Alkali Company, Cleveland, Ohio, a corporation of Delaware
No Drawing. Filed Sept. 20, 1960, Ser. No. 57,138
6 Claims. (Cl. 117—73)

This application is a continuation-in-part of my copending patent application Serial No. 663,600, filed on June 5, 1957, now Patent No. 3,159,500.

This invention relates to an improved polyester coating system and to a process for applying same to a substrate.

Heretofore wood and similar fibrous material, metal, and other common structural materials have been finished by applying thereto a lacquer, allowing the lacquer to dry and seal the surface, and thereafter coating the so-sealed surface with an unsaturated polyester resin dissolved in a polymerizable monomer. Under the best conditions the polyester film cures to a hard, infusible layer of great durability and decorativeness. In the most progressive finishing operations of this sort the lacquer contains a free radical catalyst capable of curing the polyester, and the cure of the polyester is effected by the action of the catalyst below so that the pot life of the polyester resin so applied is indefinite. Such technique is disclosed in my copending patent application, S.N. 663,600, filed on June 5, 1957, of which this application is a continuation-in-part.

In such operation the curing desired is preferably an air cure at ordinary room temperature to develop satisfactory hardness for handling in about 8–12 hours or less with a polyester film that is bright and neither wrinkled, nor soft, nor tacky, or otherwise having surface imperfections which would require additional labor for smoothing the finish. Some current foreign operations practice abrasive smoothing and polishing of the polyester topcoat at additional expense, a distinct disadvantage in a highly competitive field.

To render many conventional polyester solutions in a polymerizable monomer such as styrene suitable for surface coatings it is necessary to protect them from the cure-inhibiting action of oxygen. When not so protected, the surfaces exposed to air can stay tacky and often soft, and even when they appear to be dry they are not very resistant to solvent attack. Hence it has been the custom to add a minor amount of a waxy component to the polyester solution, e.g., paraffin wax, beeswax, stearic acid, or the like in a proportion of 0.02 to 0.2%. Initially the waxy component is soluble in the coating. As cure commences, the wax is precipitated and forms a film on the surface of the resin which protects the resin from the deleterious action of air.

I have found that the lacquer composition used as a sealer coat below the otherwise air-inhibited polyester film containing the protective waxy component is very critical with respect to modification. If the lacquer film below such polyester resin contains substantially more than about 15% of a lacquer plasticizer, the curing of the polyester resin film thereover can be seriously impaired and the protective action of the wax interfered with. In such coating systems it is especially advantageous to keep the lacquer plasticizer content as low as possible, e.g., below about 12%, and preferably below about 10%.

The process of my invention is specially adapted to coating a substrate of fibrous structure, e.g., a dense fibrous structure such as wood. In such instance the resulting article comprises the fibrous substrate, the virtually unplasticized lacquer sealer layer and the polyester resin thereover, the latter being an otherwise air-inhibited one which is protected from the deleterious action of air by the inclusion of waxy components. In the preferred embodiment the sealer layer contains a free radical catalyst, e.g., an organic peroxide capable of hardening said polyester coating material.

The free radical catalysts which are suitable for the lacquer film are generally and preferably peroxides and hydroperoxides including methyl ethyl ketone peroxide, suitably in solution in a high boiling solvent such as dimethyl phthalate, cyclohexanone peroxide, e.g., that ordinarily sold as a concentrated solution in a suitable plasticizer, tertiary butyl hydroperoxide, and hydrogen peroxide, available in organic solvent solution. I have found unpromoted benzoyl peroxide to be decidedly inferior to the foregoing ones for my purpose, but when air-inhibited polyester resins are promoted with a dialkyl aniline such as dimethyl aniline or diethyl aniline, benzoyl peroxide is satisfactory. In such instance the lacquer layer can contain the peroxide and the polyester carry a promoter such as cobalt octoate or the like. As the catalyst is ordinarily handled in a lacquer plasticizer vehicle, it is, of course, necessary to take into account the plasticizer so introduced with the catalyst into the lacquer. Accordingly, fairly highly concentrated peroxides are especially desirable, e.g., 60%+ concentration of the peroxide, and even more highly concentrated ones such as 85% cyclohexanone peroxide and 15% dibutyl phthalate carrier, which is a solid rather than a liquid composition.

The preferred type of lacquer vehicle solids for my system is a nitrocellulose. It can be either a spirit soluble (SS) grade or an RS grade which is soluble in ketones and esters in large proportion. The most highly preferred grade of nitrocellulose for the lacquer has a viscosity between ¼ and ½ second. About 25 centipoises is as low a viscosity as can be used with good sealing effect. The highest commercially available nitrocotton, which has a viscosity of 20–30 seconds, can be used if desired. The nitrocellulose lacquers give an especially desirable fullness to the resulting polyester coating system. They also can be sanded or otherwise abrasively finished when dry, before applying the polyester, in order to provide a very smooth surface for especially fine finished woodwork or other fibrous structure such as paper, cardboard, hardboard compositions, fibrous glass or fabric surfaces, and the like. Woods can be filled, if desired, as shown particularly in my co-pending patent application, S.N. 24,880, now abandoned.

While other representative types of lacquer vehicle solids also can be used in the lacquer for the practice of my invention, they are not as practical as nitrocellulose and ordinarily are more sensitive to the proportion of plasticizer which they can tolerate without interfering substantially with the cure of the polyester topcoat. Furthermore, they generally require more careful drying and give less desirable films, especially for the surface treatment of dense fibrous articles since they are not as sandable as nitrocellulose.

However, it is possible to use them in accordance with the precepts of my invention in some circumstances where they, in virtually unplasticized state, resist the solvent action of the polymerizable monomer in the polyester solution and where forced drying is practiced to insure the complete removal of volatile solvent from the lacquer film. Such vehicle solids include polyvinyl butyral, polyvinyl acetate, cellulose acetate butyrate, and epoxy polyamide resins such as those shown in U.S. Patent 2,707,708. For the purposes of this application a lacquer is a solution of the vehicle solids such as nitrocellulose in a volatile organic solvent with or without so-called "co-solvents." Typical lacquer solvents and solvent mixtures are shown on pages 12–32 of the text, "Nitrocellulose, Properties and Uses," published by the Hercules Powder Company of Wilmington, Delaware, in 1955.

A lacquer plasticizer for the purposes of this application is virtually non-volatile material which is compatible with the lacquer vehicle solids; it helps add to the flexibility of the lacquer, increases its sprayability, and imparts improved flow and wetting out of the lacquer on the surface, e.g., wood. Typical plasticizers in the lacquer sealer film are virtually nonvolatile alkyl esters of polybasic acids, e.g., dimethyl phthalate, dibutyl phthalate, dioctyl phthalate, di-2-ethylhexyl phthalate, dioctyl sebacate, tricresyl phosphate, tri-2-ethylhexyl phosphate, and the like. Broadly, however, the plasticizer can be classified as a solvent or non-solvent, as a monomeric or polymeric, or as a chemical or oil type of lacquer plasticizer. The plasticizer, of course, is lower in molecular weight than the vehicle solids of the film-former, e.g., nitrocellulose. Thus, other suitable plasticizers include raw castor oil, non-oxidizing alkyd resins, triethylene glycol-di-2-ethyl butyrate, sebacic acid alkyd resins, etc. For effectiveness of introducing the peroxide catalyst into the lacquer film a small amount of lacquer plasticizer, e.g., an alkyl ester of a polybasic acid, usually is necessary. Such amount can be as low as about 2% by weight based on the vehicle solids content of the lacquer.

Typical air-inhibited resin solutions in liquid ethylenically unsaturated monomeric materials co-polymerizable therewith are well-known and shown in J. R. Lawrence's text, "Polyester Resins," published in 1960 by the Reinhold Publishing Corporation, New York, N.Y., and in U.S. Patents 2,255,313, 2,453,665, 2,593,787, 2,777,829, and 2,843,556.

The polyester coating material ordinarily is stabilized with an inhibitor, e.g., a phenolic inhibitor such as hydroquinone, paraquinone, t-butyl catechol, etc. to enable its being stored for extended periods. The polyester can be pigmented if desired, also, e.g., by the incorporation of white pigment such as titanium dioxide. If desired it can also have a conventional thixotropic agent in it, e.g., fine silica such as Cab-o-Sil or the like. Broadly the polyester topcoating can be tinted, flattened, and/or pigmented, for example, in such a manner as to mask the red cast imparted to it when it contains a conventional cobalt drier or to reduce the sheen.

Polyester gelation and cure ordinarily is impractically slow at a temperature below about 50° F. At a temperature substantially above about 90–100° F. formation of the wax protective film is likely to be interfered with and the cure spotty because of inconsistent protection of the polyester from atmosphere. Hence the initial gelling and curing of the polyester in my process should be done at a temperature between 50° and 100° F. and advantageously between about 60° and 90° F. Within these limits, of course, different variations of suitable air-inhibited polyester resins protected with wax will have their optimum curing conditions. The lacquer sealer itself can be air-dried or force-cured in a variety of conventional manners so long as catalytic activity with respect to the polyester is not destroyed, if such catalytic activity is desired.

The following examples show ways in which my invention has been practiced but are not to be construed as limiting the invention. All parts are parts by weight, all percentages are weight percentages, and all temperatures are in degrees Fahrenheit unless otherwise expressly indicated.

The air-inhibited polyester coating material used in the exemplary preparations was made by reacting together 1.13 moles of propylene glycol, 0.5 mole of maleic anhydride and 0.5 mole of phthalic anhydride in the presence of 8% xylene.

The reaction was carried out to a maximum temperature of 375° F. in the presence of carbon dioxide, and the reaction mixture stripped of xylene solvent at a reduced pressure. The Acid Number of the product at this point was 43–45. The product was cooled to 240° F., dosed with 0.25% of a 20% solution of acetamidine hydrochloride in propylene glycol and 0.01% of 4-tertiary butyl catechol to stabilize it, then cooled further to 220° F. and cut back with 0.43 part of rubber grade styrene per part of the resulting polyester resin. This resin solution was further reduced with addition of said styrene in the proportion of 100 parts of the resin solution and 20 parts of additional styrene, then 1% of cobalt naphthenate (containing 6% cobalt) in a styrene vehicle added, and finally 1½% of a 2% solution of paraffin wax in styrene added.

In all cases the dried lacquer film was lightly rubbed with sandpaper to smooth it before applying the polyester resin topcoating.

Example 1

A lacquer sealer was compounded by blending together 12 parts by weight of dry ¼ second RS grade nitrocellulose and 88 parts of lacquer solvent consisting of 40% toluene, 5% xylene, and 55% methyl isobutyl ketone. This lacquer was catalyzed by mixing therein 4 liquid ounces per gallon of methyl ethyl ketone peroxide, a 60% solution in dimethyl phthalate plasticizer. The plasticizer concentration was about 10% based on the nitrocellulose vehicle solids in the lacquer.

The lacquer was sprayed onto a wood surface and dried at room temperature (85° F.). Thereafter the air-inhibited wax-containing polyester resin was sprayed over the lacquer film. The polyester coating was print-free with room temperature curing in about 2 hours and hardened to give a clear, uniform, unwrinkled surface in about 8 hours with no tack after the protective coating of wax was wiped off.

Example 2

A lacquer similar to that of Example 1 was dosed with 5 ounces per gallon of the catalyzer, giving a plasticizer concentration of about 13%. When the lacquer was utilized in the same way as that of Example 1 the polyester curing was satisfactory but somewhat slower. However, the protective wax film was uniform and not spotty, whereas spottiness had been observed in similar coatings using a more highly plasticized lacquer (approaching 20% plasticizer content).

In the place of the catalyst material used in the foregoing examples, 3 ounces per gallon of a mixture of 85% cyclohexanone peroxide and 15% dibutyl phthalate carrier can be used to catalyze the lacquer quite satisfactorily for this service.

I claim:

1. In a process for coating a surface with a polyester coating material comprising a solution of unsaturated polyester in a polymerizable monomer wherein the surface is coated with a lacquer film containing a solution of vehicle solids in a volatile organic solvent, and a free radical catalyst capable of hardening said polyester coating material, solvent is thereafter evaporated from said lacquer film, and the polyester coating is applied, the improvement which comprises: applying as the lacquer film a solvent cut of vehicle solids containing 2–15% of lacquer plasticizer based on lacquer vehicle solids; evaporating solvent from said film; and thereafter applying as the polymer coating an otherwise air-inhibited one which is protected from the deleterious action of air by the inclusion of a waxy component.

2. The process of claim 1 wherein there is 2–12% of lacquer plasticizer, and the plasticizer is at least one alkyl ester of a polybasic acid.

3. The process of claim 1 wherein the lacquer consists essentially of nitrocellulose dissolved in a volatile organic solvent.

4. The process of claim 3 wherein the lacquer film is dried, then abrasively finished prior to applying the polyester film, and the resulting polyester coating is allowed to cure at a temperature between about 60° and 90° F.

5. A coated article comprising a substrate of fibrous structure, a sealer layer of abrasively finished nitrocellulose lacquer solids deposited from a volatile organic solvent, said sealer layer containing 2–15% lacquer plasticizer based on the nitrocellulose solids and a free radical catalyst capable of curing an unsaturated polyester dissolved in a polymerizable monomer, and a coating on said sealer layer of an otherwise air-inhibited unsaturated polyester dissolved in a polymerizable monomer and protected from the deleterious action of air by a surface film of waxy substance.

6. In a process for coating a surface with a polyester coating material comprising a solution of unsaturated polyester in a polymerizable monomer wherein the surface is coated with a lacquer film containing nitrocellulose dissolved in a volatile organic liquid and a free radical catalyst in an amount sufficient to harden said polyester coating material, solvent is thereafter evaporated from said lacquer film, and the polyester coating is applied, the improvement which comprises: applying as a lacquer film a solvent cut of nitrocellulose containing 2 to 12 percent of lacquer plasticizer, based on said nitrocellulose, said plasticizer comprising at least one alkyl ester of a polybasic acid; evaporating said solvent from said film and thereafter applying as the polyester coating an otherwise air-inhibited one which is protected from the deleterious action of air by the inclusion therein of a waxy component and allowing the resulting polyester coating to cure at a temperature between about 60° and 90° F.

References Cited by the Examiner

UNITED STATES PATENTS

| 2,772,986 | 12/1956 | Buck | 117—73 |
| 2,778,745 | 2/1957 | La Berge et al. | 117—85 X |
| 2,843,556 | 7/1958 | Moorman | 260—28.5 |
| 2,927,867 | 3/1960 | Hings | 117—161 X |
| 2,978,354 | 4/1961 | Lesser | 117—72 X |

FOREIGN PATENTS

| 1,025,302 | 2/1958 | Germany. |

OTHER REFERENCES

Organic Coating Technology, Payne, vol. 1, page 444, John Wiley and Sons, 1954.

JOSEPH B. SPENCER, *Primary Examiner.*

RICHARD D. NEVIUS, *Examiner.*